(12) United States Patent
Keppy et al.

(10) Patent No.: US 9,453,449 B2
(45) Date of Patent: Sep. 27, 2016

(54) DIESEL EXHAUST SYSTEM AND METHOD FOR CONTROLLING EXHAUST FLUID DOSING

(71) Applicant: Robert Bosch GmbH, Stuttgart (DE)

(72) Inventors: Brent D. Keppy, Waterford, MI (US); Mark Casarella, Ypsilanti, MI (US); Maria Dolores Marenco Jimenez, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 52 days.

(21) Appl. No.: 14/590,688

(22) Filed: Jan. 6, 2015

(65) Prior Publication Data

US 2016/0194996 A1    Jul. 7, 2016

(51) Int. Cl.
*F01N 3/20* (2006.01)
*F01N 3/28* (2006.01)

(52) U.S. Cl.
CPC ........... *F01N 3/2896* (2013.01); *F01N 3/2066* (2013.01)

(58) Field of Classification Search
CPC ............. F01N 3/005; F01N 2560/028; F01N 2570/22; F01N 2900/1622; F01N 2900/1628
See application file for complete search history.

(56) References Cited

U.S. PATENT DOCUMENTS

| | | | |
|---|---|---|---|
| 7,991,533 B2 | 8/2011 | Huang | |
| 8,135,535 B2 | 3/2012 | Karnik et al. | |
| 8,434,298 B2 | 5/2013 | Adelman et al. | |
| 8,453,434 B2 | 6/2013 | Yacoub | |
| 8,459,243 B2 | 6/2013 | Van Nieuwstadt et al. | |
| 2011/0094208 A1 | 4/2011 | Bauer et al. | |
| 2011/0120092 A1 | 5/2011 | Dentici | |
| 2012/0310507 A1 | 12/2012 | Auckenthaler | |
| 2013/0289857 A1 | 10/2013 | Schmitt et al. | |
| 2013/0338900 A1 | 12/2013 | Ardanese et al. | |
| 2014/0123968 A1 | 5/2014 | Farman et al. | |
| 2014/0180559 A1 | 6/2014 | Light-Holets | |
| 2014/0188368 A1 | 7/2014 | Wilhelm et al. | |
| 2015/0204228 A1* | 7/2015 | Hayashi ................ | F01N 11/005 60/276 |

FOREIGN PATENT DOCUMENTS

| | | |
|---|---|---|
| JP | 2010216390 | 9/2010 |
| WO | 2013191067 | 12/2013 |

OTHER PUBLICATIONS

International Search Report for International Appl. No. PCT/EP2015/074959, dated Dec. 14, 2015, 6 pages.
Written Opinion of the International Search Authority for International Appl. No. PCT/EP2015/074959, dated Dec. 14, 2015, 6 pages.

* cited by examiner

*Primary Examiner* — Jonathan Matthias
(74) *Attorney, Agent, or Firm* — Michael Best & Friedrich LLP

(57) ABSTRACT

A method for controlling dosing of a diesel exhaust fluid includes providing a diesel engine and an exhaust system. The exhaust system includes an exhaust aftertreatment device and is coupled to the diesel engine. An injection device is provided in the exhaust system for dosing the diesel exhaust fluid into the exhaust system according to a predetermined routine. A water condensation content of the exhaust aftertreatment device is determined. A dosing event, directed by the predetermined routine, is precluded so that the injection device is not operated to provide diesel exhaust fluid to the exhaust aftertreatment device when the water condensation content of the exhaust aftertreatment device is determined to be above a specified threshold value.

18 Claims, 6 Drawing Sheets

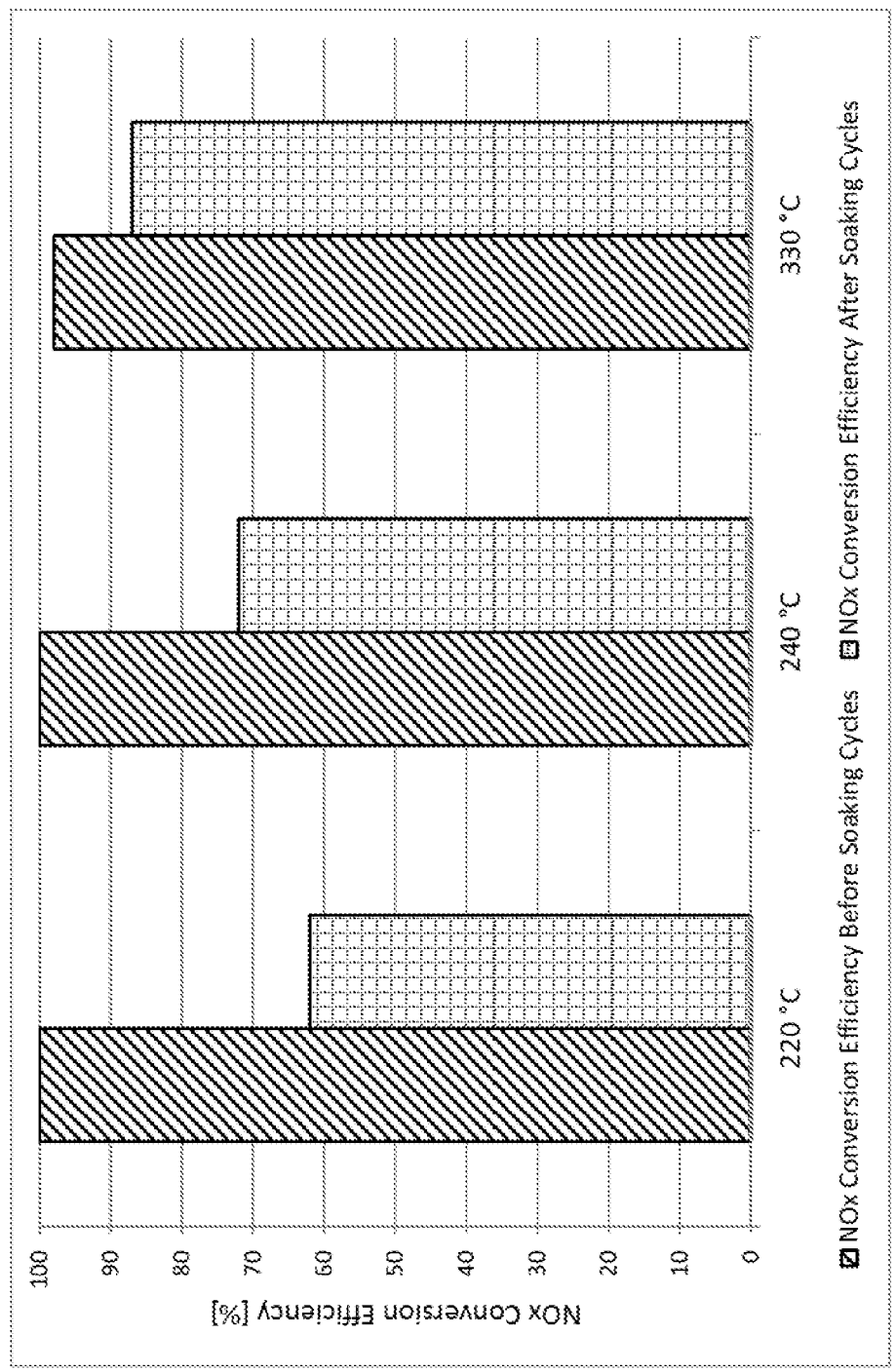

DIESEL EXHAUST SYSTEM AND METHOD FOR CONTROLLING EXHAUST FLUID DOSING

BACKGROUND OF THE INVENTION

In order to prevent the exhaust of unburned fuel, diesel engines can be run with a lean air-to-fuel ratio (greater than stoichiometric). However, the excess oxygen present within lean combustion produces nitrogen oxides. Therefore, diesel engines produce a significant amount of nitrogen oxides amongst other various pollutants. Government regulations require certain measures to be taken to limit the amount of pollutants that enter the atmosphere. This includes providing exhaust aftertreatment devices, such as selective catalytic reduction (SCR) systems, within the exhaust of many diesel vehicles.

SCR systems contain a catalyst washcoat through which the exhaust of the diesel engine must pass. Periodically, a diesel exhaust fluid or reductant, such as urea, anhydrous ammonia, or aqueous ammonia is dosed in front of the catalyst. This fluid decomposes into ammonia and other gases, and the ammonia is adsorbed in the catalyst washcoat. As the exhaust gas passes through the washcoat containing the ammonia, a reduction reaction converts the pollutants (e.g., $NO_x$) to less harmful products: nitrogen ($N_2$), water ($H_2O$), and/or carbon dioxide ($CO_2$), depending on the diesel exhaust fluid used. The scheduled timing of the dosing, as well as the amount of diesel exhaust fluid dosed is very important to ensure that the SCR system functions correctly. If the catalyst washcoat does not contain enough adsorbed ammonia, pollutants will pass through the SCR system unreacted. If too much diesel exhaust fluid is injected, the ammonia passes through the SCR system unreacted.

SUMMARY OF THE INVENTION

The invention provides, in one aspect, a method for controlling dosing of a diesel exhaust fluid. A diesel engine is provided and an exhaust system, including an exhaust aftertreatment device, is coupled to the diesel engine. An injection device is provided in the exhaust system for dosing the diesel exhaust fluid into the exhaust system according to a predetermined routine. A water condensation content of the exhaust aftertreatment device is determined. A dosing event, directed by the predetermined routine, is precluded so that the injection device is not operated to provide diesel exhaust fluid to the exhaust aftertreatment device when the water condensation content of the exhaust aftertreatment device is determined to be above a specified threshold value.

The invention provides, in another aspect, a diesel exhaust system for treating an exhaust gas from a diesel engine. The diesel exhaust system includes an exhaust aftertreatment device. An injection device is configured to introduce a diesel exhaust fluid into the exhaust aftertreatment device. A controller is programmed to receive outputs from a plurality of sensors. The controller is programmed to determine a water condensation content of the exhaust aftertreatment device, and to provide an output controlling the actuation of the injection device on the basis of the determined water condensation content of the exhaust aftertreatment device.

The invention provides, in yet another aspect, a method for controlling dosing of a diesel exhaust fluid within an exhaust system coupled to a diesel engine. A water condensation content of an exhaust aftertreatment device is analyzed with a controller based on one or more inputs to the controller. The controller verifies that the water condensation content within the exhaust aftertreatment device is below a specified water condensation threshold. A control signal is sent from the controller to a diesel exhaust fluid injection device to dose the exhaust aftertreatment device with the diesel exhaust fluid upon verification that the water condensation content within the exhaust aftertreatment device is below the specified water condensation threshold.

Other features and aspects of the invention will become apparent by consideration of the following detailed description and accompanying drawings.

BRIEF DESCRIPTION OF THE DRAWINGS

FIG. 4 is a graph comparing the $NO_x$ conversion efficiency of an exhaust aftertreatment device before and after soaking cycles at various temperatures.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
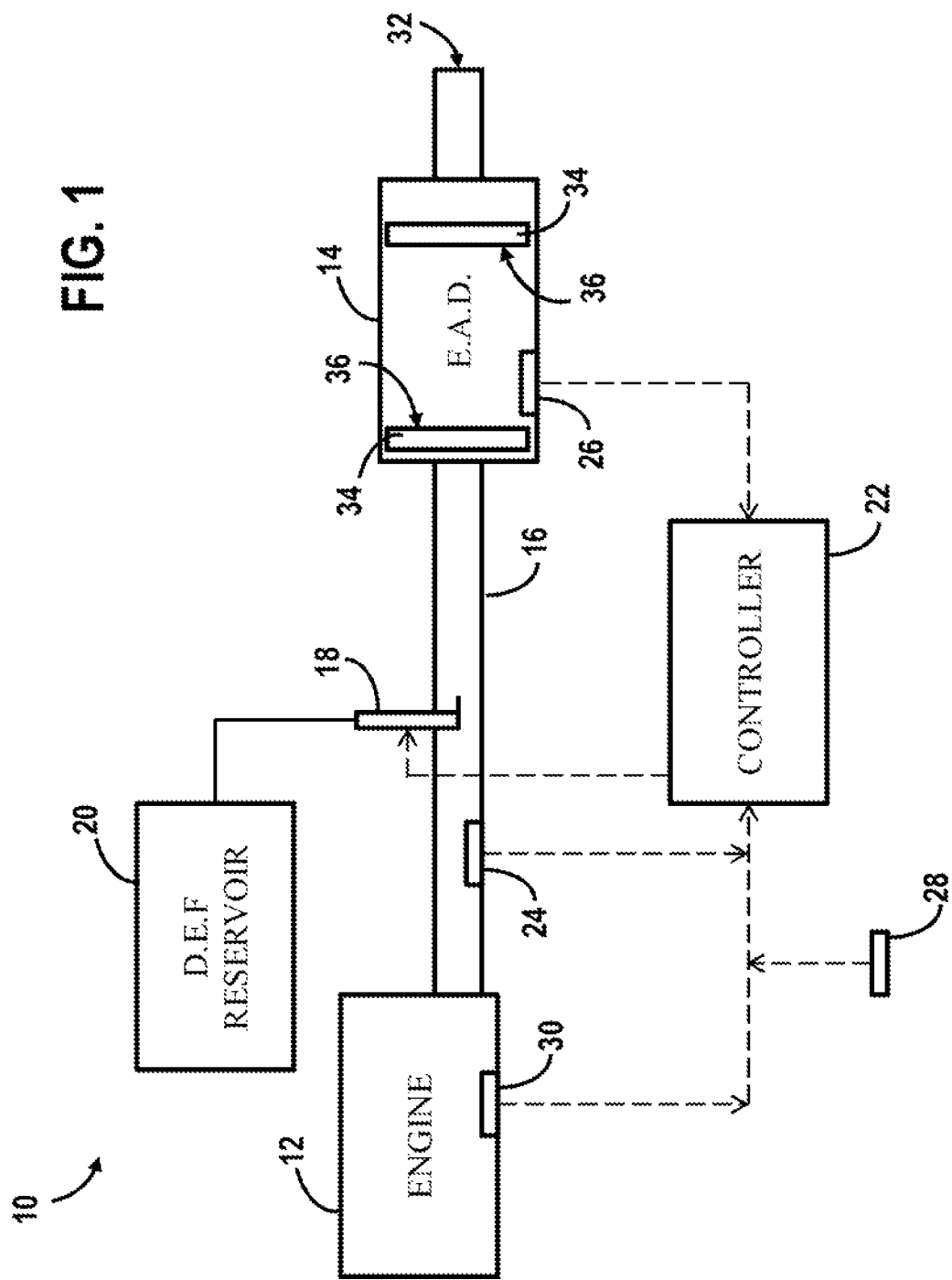
FIG. 1 is a schematic representation of a diesel engine and exhaust system.

A diesel exhaust system 10, as shown in FIG. 1, is connected to a diesel engine 12. The engine 12 is connected to an exhaust conduit 16 defining an internal passage for receiving and guiding combustion reaction exhaust gases away from the engine 12 and out to the environment. The exhaust conduit 16 can include multiple exhaust pipe segments and extends from a first end at the engine 12 to a second end 32 where the exhaust is released into the environment. An exhaust aftertreatment device 14 is located within the diesel exhaust system 10 and can further define a portion of the conduit 16. The exhaust gas within the exhaust conduit 16 must pass through the exhaust aftertreatment device 14 before it is expelled into the environment. The exhaust aftertreatment device 14 can be embodied as a selective catalytic reduction (SCR) system comprising a substrate 34 for catalyst material. The exhaust aftertreatment device 14 may comprise multiple substrate sections 34, each having a surface area covered with a catalyst washcoat 36, in series with one another along the length of the exhaust conduit 16. Although not shown, the exhaust system 10 can contain various additional components such as a turbocharger to increase engine power, and/or a muffler to reduce the noise of the exhaust.

An injection device 18 is mounted to the exhaust conduit 16 and is selectively operable to inject, or dose, a fluid into the exhaust conduit 16. The injection device 18 may include an atomizer or nozzle for improved fluid dispersion. The injection device 18 is positioned such that the fluid is injected upstream of the exhaust aftertreatment device 14. The fluid is a diesel exhaust fluid (e.g., urea-water mixture, AdBlue, etc.) that, when in gaseous form, reacts with pollutants of the diesel exhaust gases to convert the pollutants to products such as water and nitrogen. The fluid is stored in a diesel exhaust fluid reservoir 20, which is fluidly connected to the injection device 18. A controller 22 is electrically coupled to the injection device 18 to selectively energize the injection device 18 for dosing the exhaust aftertreatment device 14 according to a predetermined routine. This predetermined routine may include factors such as timing, mileage, and other triggering events.

Figure 5A:
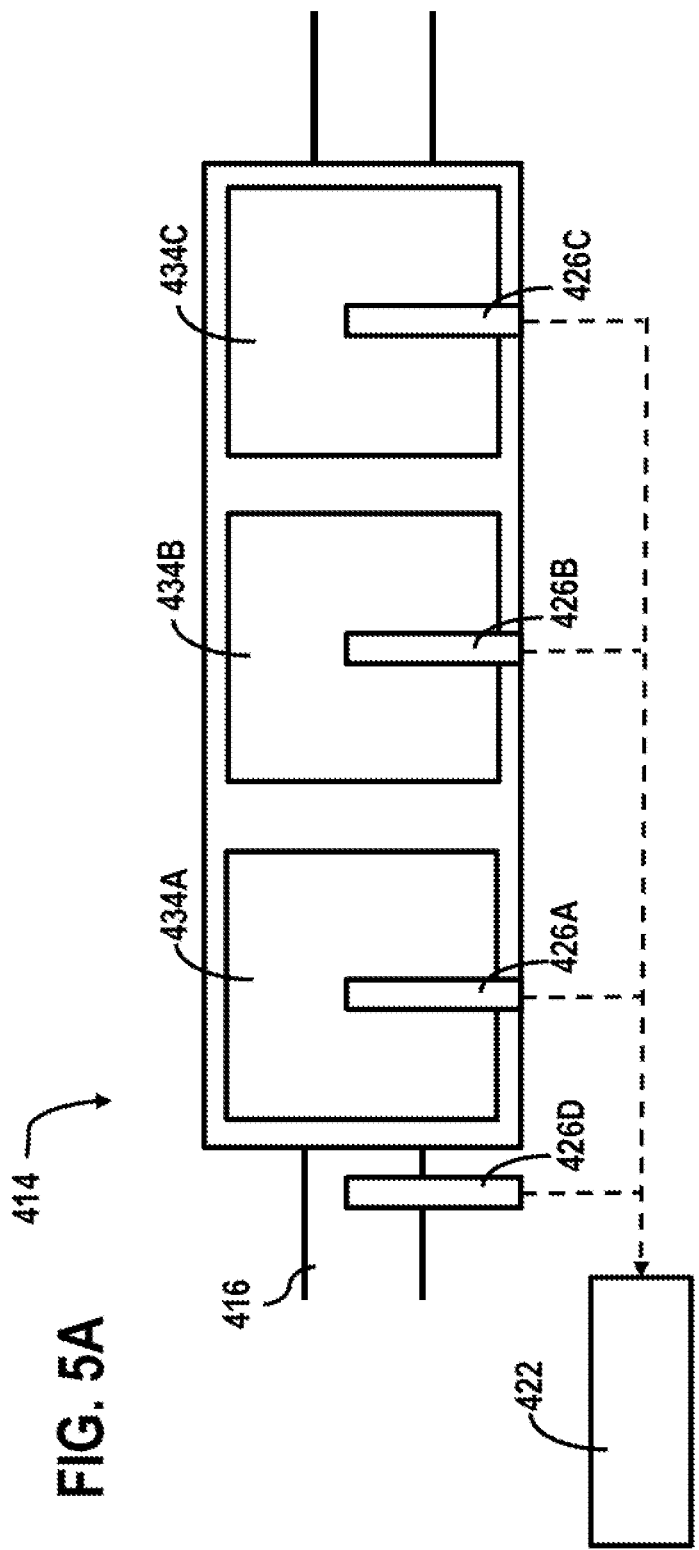
FIG. 5A is a schematic representation of an exhaust aftertreatment device, measurement devices, and a controller.

The controller 22 is in further electrical connection with a plurality of sensors 24, 26, 28, 30 located throughout the vehicle. A first sensor 24, a temperature sensor, is configured to measure a temperature of the exhaust gas within the diesel exhaust system 10 upstream of the exhaust aftertreatment device 14. A second sensor 26, also a temperature sensor, is configured to measure a temperature of the exhaust aftertreatment device 14. A third sensor 28 is configured to measure an environmental parameter, such as ambient humidity or ambient temperature. A fourth sensor 30 is configured to measure a diesel engine parameter. For example, the fourth sensor 30 can measure an operational speed of the diesel engine 12 coupled to the diesel exhaust system 10 or a fuel flow rate through the diesel engine 12. The controller 22 electrically receives and analyzes output signals from the plurality of sensors 24, 26, 28, 30 and creates a water condensation model based on these output signals. The output signals from the plurality of sensors 24, 26, 28, 30 are considered inputs to the controller 22. The controller 22 can be further configured to record a plurality of time durations including a dosing time and an engine cycle time. The dosing time is defined as the amount of time the injection device 18 is dosing the exhaust aftertreatment device 14 per dosing event. The engine cycle time is defined as the time between engine starts, or the time between when the engine 12 is turned off until the engine 12 is turned on again. Modifications within the scope of the invention are contemplated, for example, providing different combinations and multiples of sensors 24, 26, 28, 30, such as one sensor per substrate 34 as shown in FIG. 5A. Further, additional sensors configured to measure alternative parameters can be utilized to provide additional refinement of the water condensation model.

The sensors 24, 26, 28, 30 may also be used to calculate the heat flux in the exhaust conduit 16. Calculating the heat flux not only assists in determining the condensation of the water vapor, but also the subsequent evaporation of the water vapor in the catalyst washcoat 36. Various vehicle parameters and values are measured to determine the heat flux. Such values include air and fuel consumption, temperatures and pressures of the intake and the exhaust, exhaust gas recirculation (EGR) rate, as well as other variables normally measured or derived by the engine control software.

The water condensation model is an approximation of the amount of liquid water present within the exhaust aftertreatment device 14. More specifically, the water condensation model can be approximation of the amount of liquid water present within the catalyst washcoat 36 of the exhaust aftertreatment device 14. When the controller 22 determines that the water condensation content is above a specified threshold value or specified condensation threshold, a signal is relayed from the controller 22 to the injection device 18 to preclude the dosing event that is normally directed by the predetermined routine. The condensation threshold may be any value ranging from (and including) zero to fully saturated. If the threshold is zero, the controller 22 prevents dosing any time it determines that condensation is present. The water condensation model may allow the controller 22 to determine an actual value indicative of the amount of water condensation present within the exhaust aftertreatment device 14 (e.g. psychrometric properties). Alternatively, the water condensation model can simply enable a binary signal to be output by the controller 22.

Once the water condensation content of the exhaust aftertreatment device 14 is determined by the controller 22 to be below the specified threshold value, the controller 22 sends a signal to the injection device 18 to dose the exhaust aftertreatment device 14 with the diesel exhaust fluid as discussed below with respect to the method of FIG. 2.

Figure 2:
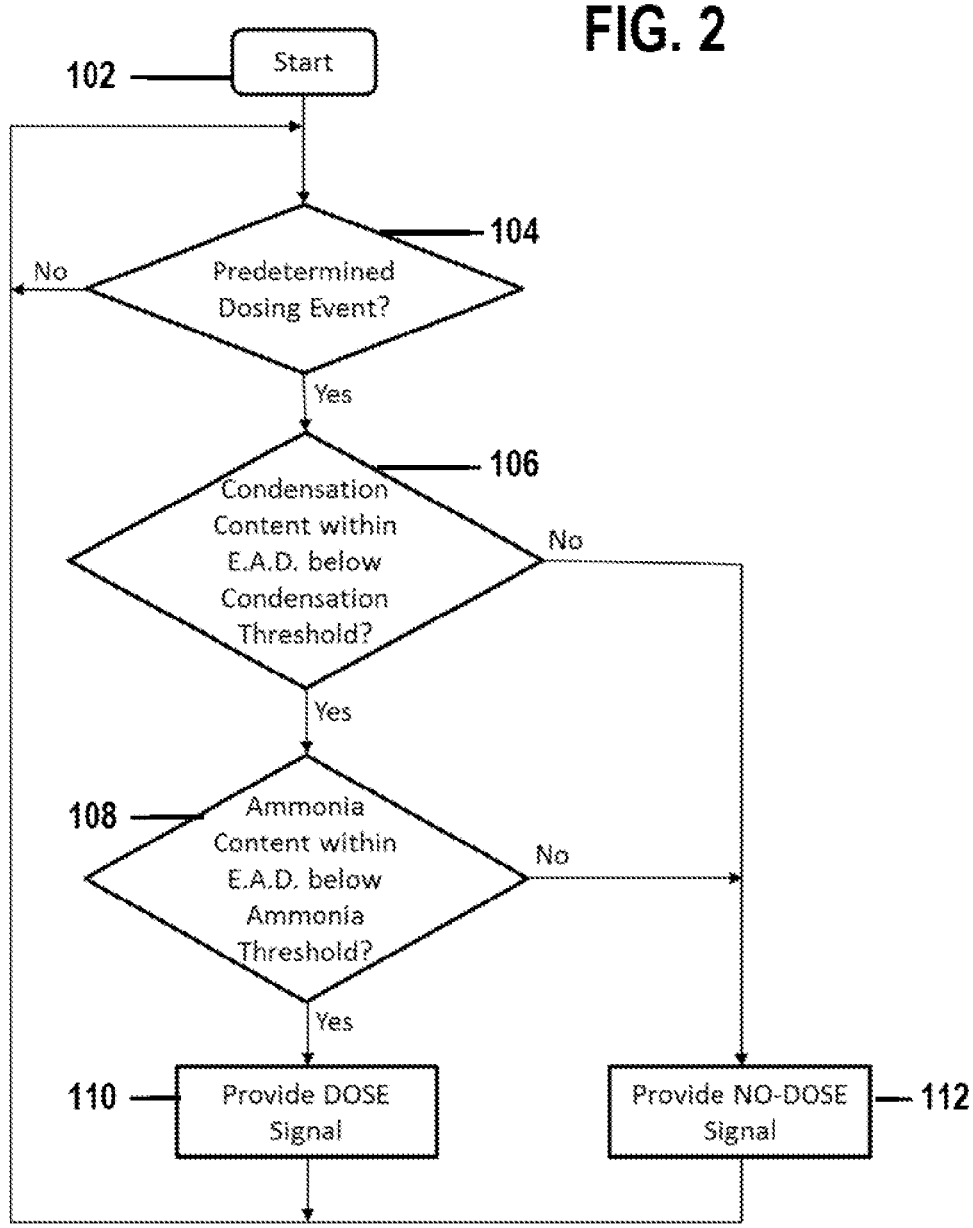
FIG. 2 is a flowchart illustrating an exhaust fluid dosing method according to one embodiment of the present invention.

The flowchart of FIG. 2 illustrates a method of controlling dosing of a diesel exhaust fluid within the exhaust system 10 coupled to the diesel engine 12. In a first step 102, the method is started. The diesel engine 12 is running and providing exhaust through the exhaust conduit 16. At a second step 104, the controller 22 analyzes a predetermined routine to determine if it is an appropriate time to dose the exhaust aftertreatment device 14 with a diesel exhaust fluid. If the controller 22 determines it is not an appropriate time to dose, it will check again. Additionally, a time delay may exist between the cycling of step 104 if it is not an appropriate time to dose.

If, based on the predetermined routine, the controller 22 determines that it is an appropriate time to dose, the flowchart continues to a third step 106. In step 106, the controller 22 analyzes the water condensation content within the exhaust aftertreatment device 14 (e.g., the condensation content of the SCR catalyst washcoat 36). If the water condensation content is below the specified condensation threshold, the controller 22 may optionally proceed by analyzing the ammonia content within the exhaust aftertreatment device 14 at step 108. The ammonia content can be modeled by analyzing many of the same parameters measured by sensors 24, 26, 28, 30 as well as various other dynamic parameters. If the amount of ammonia present within the exhaust aftertreatment device 14 is greater than a specified ammonia threshold, it will cause an unacceptably high ammonia slip in which unreacted ammonia passes through the exhaust aftertreatment device 14. Alternatively, an affirmative response to the condition of step 106 may proceed directly to step 110. If the water condensation content is not determined to be below the specified condensation threshold at step 106, or the ammonia content is checked after affirmation of low condensation and the ammonia content is not determined to be below a specified ammonia threshold, a NO-DOSE control signal is provided from the controller 22 to the injection device 18, as shown in step 112. The NO-DOSE signal precludes the normal dosing event and can constitute an actual signal or simply refraining transmission of a DOSE signal that would otherwise be sent according to the predetermined routine.

Once the NO-DOSE signal is produced at step 112, the method returns to step 104. Alternatively, the method can skip step 104 after returning from step 112 and continue checking condensation, and optionally ammonia content, until a DOSE control signal is produced. In this way, the dosing event from the predetermined routine is not skipped, but merely delayed. Step 110 is reached once the water condensation content is determined at step 106 to be below the specified condensation threshold and, may optionally be further dependent on if the ammonia content is determined at step 108 to be below the specified ammonia threshold. As a result, the DOSE signal is provided from the controller 22 at step 110 to actuate the injection device 18 and a predetermined quantity of the diesel exhaust fluid is dosed into the exhaust system 10.

Figure 3:
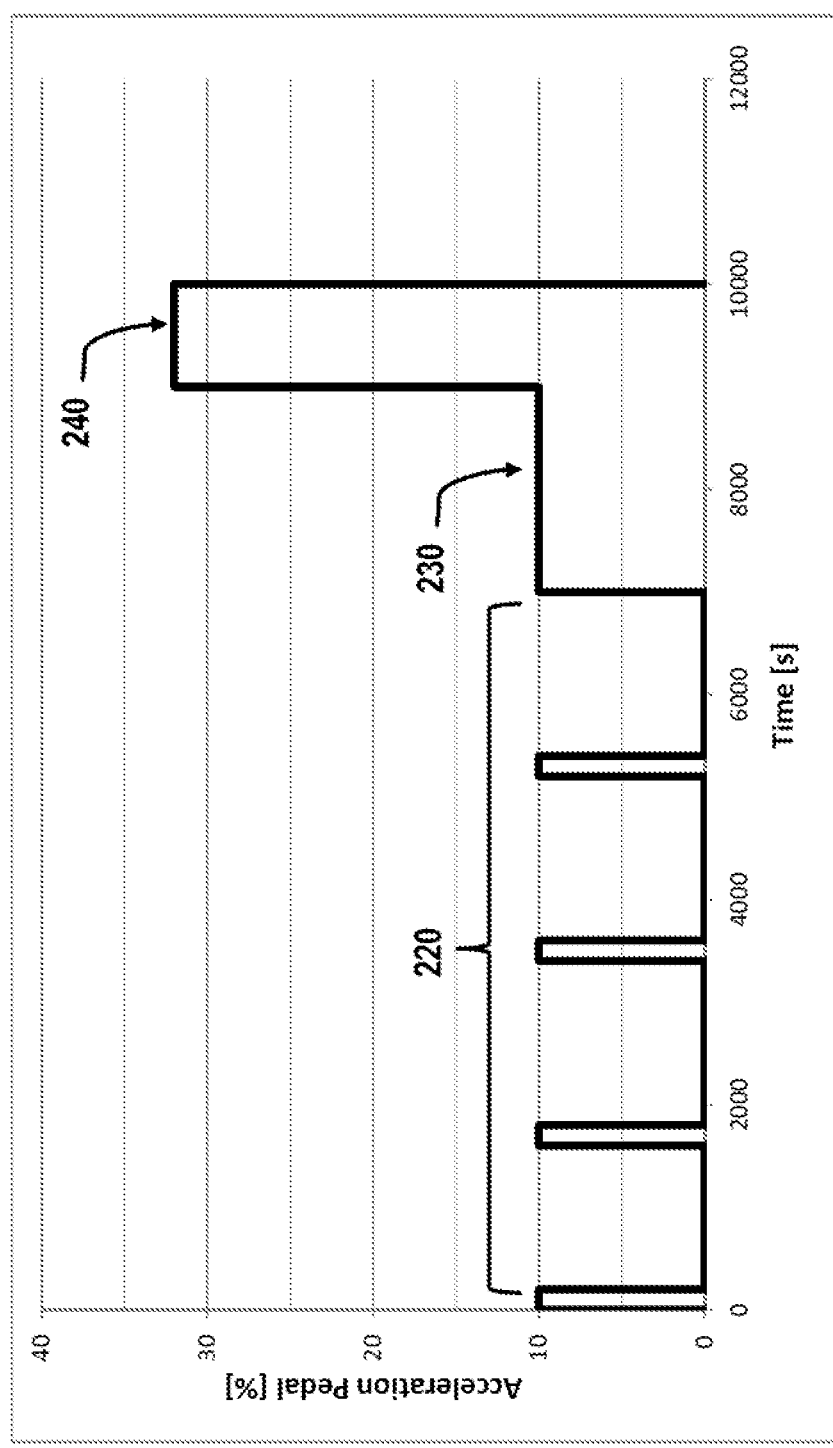
FIG. 3 is a graph illustrating one engine test cycle that prompts water condensation build-up in an exhaust aftertreatment device and dosing of diesel exhaust fluid into the exhaust aftertreatment device when saturated.

FIG. 3 graphically illustrates an exemplary testing scenario, which was carried out to evaluate the effects of dosing diesel exhaust fluid into an exhaust aftertreatment device containing condensation, and the results of which have resulted in the improved dosing strategy, such as the one shown in FIG. 2. Time is shown along the horizontal axis, for example, measured in seconds. Along the vertical axis, the acceleration pedal percentage refers to the overall distance which the acceleration pedal is depressed relative to the maximum distance achievable. This measurement is otherwise akin to various engine or driving parameters such as throttle opening, engine speed (i.e., RPM), engine torque, or vehicle speed.

In a first duration 220, the engine 12 (at ambient temperature) is operated for a plurality of short periods of time (e.g., each less than or equal to 200 seconds, each less than or equal to 500 seconds, etc.) separated by longer periods of non-operation. During the periods of operation, the acceleration pedal is not depressed, or is depressed only a minimal amount (e.g., ten percent of the total travel). During the duration 220, the engine 12 is intentionally subjected to several repeated cold starts. For example, the engine 12 is started cold and runs for 200 seconds, is turned off for 1400 seconds, and repeats. In operation, the engine 12 does not run for long enough to increase the temperature of the exhaust system 10 considerably or necessitate dosing. As the temperature does not increase greatly during the short periods of operation in the initial duration 220, the engine 12 and the exhaust system 10 cool back to ambient temperature in the subsequent long break, so that each cold start results in water condensation from the exhaust gases forming on the washcoat or washcoats 36 within the exhaust aftertreatment device 14.

This water condensation buildup continues throughout the initial duration 220. After the last of the series of cold starts, the engine 12 is run for a time period 230 long enough to allow for dosing of the diesel exhaust fluid (e.g., 2000 seconds). The period 230 directly following the period 220 of multiple colds starts ensures that the diesel exhaust fluid is dosed into a washcoat 36 that is saturated with condensation (i.e., water-soaked).

The accelerator pedal is then held at a greater depression amount (as shown, 32 percent of total travel), which increases the overall temperature of the exhaust aftertreatment device 14. This period 240 removes all of the diesel exhaust fluid and the water condensation from the washcoat 36, effectively emptying the exhaust aftertreatment device 14. Once the washcoat 36 is emptied, the engine 12 and exhaust system 10 cool down to return to the initial engine and exhaust system parameters (e.g., at ambient temperature, empty washcoat, etc.) so the next cycle may begin.

The test cycle of FIG. 3 was repeated numerous times to evaluate the effects of dosing diesel exhaust fluid into a water-soaked washcoat 36. When the diesel exhaust fluid combines with the condensation on the washcoat 36, an alkaline mixture is created. When the washcoat 36 is exposed to the alkaline mixture over many cycles (especially mixtures with a pH of 12 or more), a chemical reaction may occur in some washcoat formulations which causes the washcoat 36 to breakdown or delaminate.

Experimental results, as shown in FIG. 4, show the loss in $NO_x$ conversion efficiency after dosing diesel exhaust fluid into a water-soaked washcoat 36. In a test, as outlined in FIG. 3, designed to quickly and repeatedly dose exhaust fluid into the water-soaked washcoats 34 of the exhaust aftertreatment device 14, only a short number of cycles (e.g., 57 cycles) are run before the achievable $NO_x$ conversion efficiency of the exhaust aftertreatment device 14 decreases significantly as shown in FIG. 4. However, when water condensation builds up and is mixed with diesel exhaust fluid at low temperatures, the loss in efficiency can be even greater, potentially decreasing the usable life of the washcoat 36. As shown in FIG. 4, when regularly dosed at 220 degrees C., after the specified number of test cycles, the conversion efficiency of the exhaust aftertreatment device 14 dropped thirty-eight percent. At 240 degrees C., the efficiency dropped twenty-eight percent, and at 330 degrees C., the efficiency dropped eleven percent.

Figure 5B:
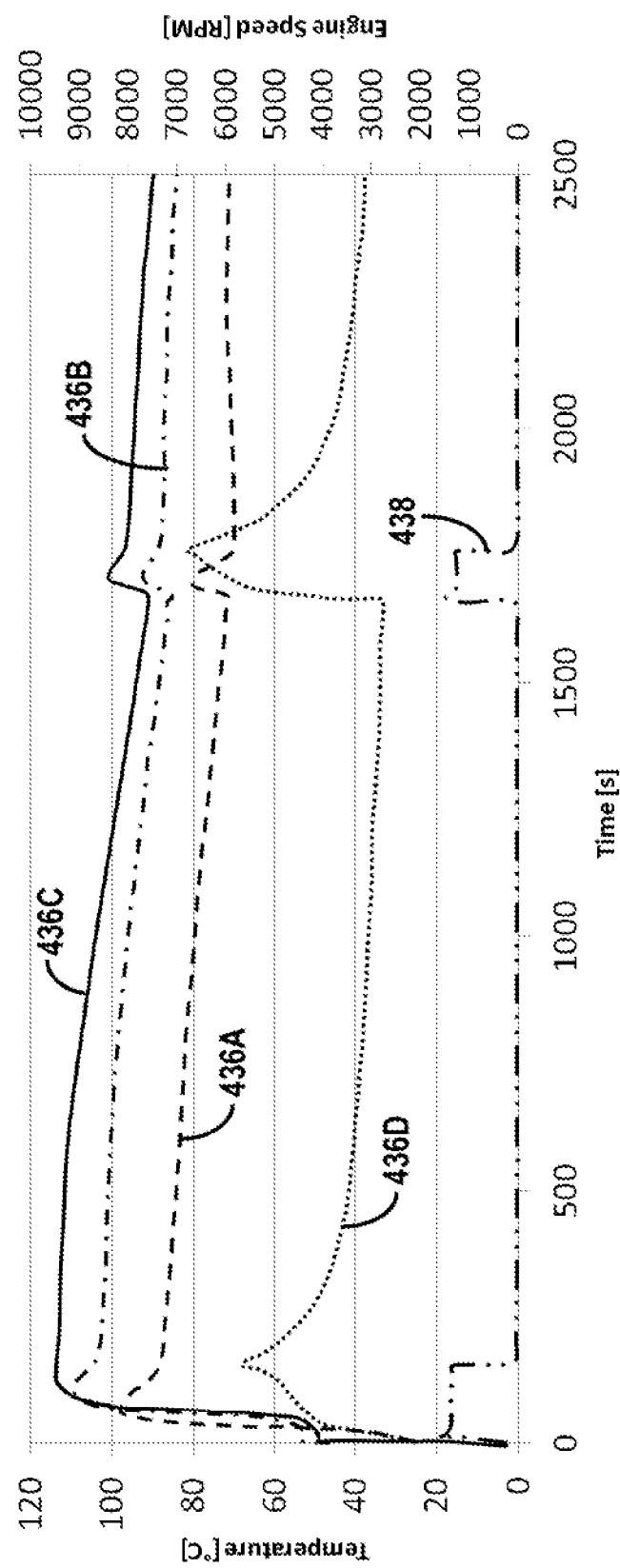
FIG. 5B is a graph illustrating the outputs of the measurement devices of FIG. 5A.

FIGS. 5A-5B relate to an alternative exhaust aftertreatment device 414. However, the alternative exhaust aftertreatment device 414 of FIGS. 5A-5B can be used with the structure and method previously described with respect to FIGS. 1-4, as a substitute for the exhaust aftertreatment device 14 and its accompanying single temperature sensor 26. A schematic of one specific example of an array of temperature sensors 426A-D within the exhaust aftertreatment device 414 with multiple washcoats 434A-C is shown in FIG. 5A. The array of temperature sensors 426A-C is provided, as shown, one for each catalyst substrate and washcoat 434A-C. Additionally, an inlet temperature sensor 426D is provided within the exhaust conduit 416, upstream of the exhaust aftertreatment device 414. These sensors 426A-D are connected to a controller 422 which gathers and stores outputs from the sensors 426A-D. The controller 422 may be similar to the controller 22 of FIG. 1, with the exception of having additional inputs from the exhaust aftertreatment device 414.

FIG. 5B graphically illustrates the outputs 436A-D of the sensors 426A-D of FIG. 5A in response to closely repeated cold starts. Each output 436A-D corresponds numerically to the respective sensor 426 A-D, for example, output 436A is the output of sensor 426A. In this particular test, the engine speed 438 increases (e.g., reaching 1200 RPM as shown on the secondary vertical axis) for a short duration (e.g., 200 seconds; horizontal axis) and then returns to rest (i.e., 0 RPM). After a length of time greater than the short duration (e.g., 1500 seconds), allowing the exhaust aftertreatment device 414 to cool, the rotational speed 438 of the engine is once again increased (e.g., 1200 RPM) for a short duration (e.g., 150 seconds). The temperature response at various points along the length of the exhaust aftertreatment device 414 is shown, as denoted by the primary vertical axis. As shown in the graph, the temperature recorded by the inlet sensor 426D (output 436D) is considerably less than the temperature (output 436C) of the last catalyst substrate and washcoat 434C due to the heat of condensation. As the water vapor in the exhaust condenses, heat is released. As the engine 12 is run for a second time, the temperatures recorded by the substrate and washcoat sensors 426A-C show very little increase relative to the increase in temperature at the inlet (output 436D). This indicates that the substrates and washcoats 434A-C are saturated, or at least the first substrate and washcoat 434A is saturated. This provides an indication of water condensation content within the exhaust aftertreatment device 414. In this way, temperature response can provide an indication of water condensation within the exhaust gas aftertreatment device 414, but the temperature varies along the length of the device 414 and other factors may contribute to the condensation content. Therefore, determining the water condensation content of the exhaust aftertreatment device 414 may provide a more accurate and telling indication of a safe dosing time than merely refraining from dosing until a particular temperature value is observed.

What is claimed is:

1. A method for controlling dosing of a diesel exhaust fluid within an exhaust system coupled to a diesel engine, the method comprising:
   analyzing a water condensation content of an exhaust aftertreatment device with a controller based on one or more inputs to the controller, the analysis including recording with the controller a plurality of time durations including a dosing time defined as the amount of time a diesel exhaust fluid injection device is dosing the exhaust aftertreatment device per dosing event, and an engine cycle time defined as the time between when the engine is turned off until the engine is turned on again;
   verifying with the controller that the water condensation content within the exhaust aftertreatment device is below a specified water condensation threshold; and
   sending a control signal from the controller to the diesel exhaust fluid injection device to dose the exhaust aftertreatment device with the diesel exhaust fluid upon verification that the water condensation content within the exhaust aftertreatment is below the specified water condensation threshold.

2. The method of claim 1, further comprising verifying with the controller that an ammonia content within the exhaust aftertreatment device is below a specified ammonia threshold prior to dosing the exhaust aftertreatment device with the diesel exhaust fluid.

3. The method of claim 1, wherein analyzing the water condensation content includes measuring a temperature of the exhaust system upstream of the exhaust aftertreatment device and inputting the measured exhaust system temperature to the controller.

4. The method of claim 3, wherein analyzing the water condensation content further includes measuring a temperature of the exhaust aftertreatment device and inputting the measured exhaust aftertreatment device temperature to the controller.

5. The method of claim 4, wherein analyzing the water condensation content further includes measuring one or both of an ambient humidity and an ambient temperature and inputting the measured ambient humidity and/or the measured ambient temperature to the controller.

6. The method of claim 5, wherein analyzing the water condensation content further includes measuring one or both of an operational speed of the diesel engine coupled to the exhaust system and a fuel flow rate through the diesel engine and inputting the measured operational speed and/or the measured fuel flow rate to the controller.

7. The method of claim 1, wherein the exhaust aftertreatment device is a selective catalytic reduction system comprising a catalyst washcoat, the method further comprising:
   reacting the diesel exhaust fluid with a plurality of nitrogen oxide particles in the catalyst washcoat to create a plurality of water and nitrogen particles; and
   discharging the plurality of water and nitrogen particles through the exhaust conduit.

8. A method for controlling dosing of a diesel exhaust fluid, the method comprising:
   providing a diesel engine and an exhaust system coupled to the diesel engine, the exhaust system including an exhaust aftertreatment device;
   providing an injection device in the exhaust system for dosing the diesel exhaust fluid into the exhaust system according to a predetermined routine;
   determining a water condensation content of the exhaust aftertreatment device, the determination being made at least in part by recording, with a controller electrically coupled to the injection device, a plurality of time durations including a dosing time defined as the amount of time the injection device is dosing the exhaust aftertreatment device per dosing event, and an engine cycle time defined as the time between when the engine is turned off until the engine is turned on again; and
   determining with the controller that the water condensation content of the exhaust aftertreatment device is below a specified threshold value, and in response, actuating the injection device with the controller to dose the exhaust aftertreatment device with the diesel exhaust fluid.

9. The method of claim 8, wherein determining the water condensation content of the exhaust aftertreatment device comprises measuring a temperature of the exhaust system upstream of the exhaust aftertreatment device and measuring a temperature of the exhaust aftertreatment device.

10. The method of claim 9, wherein determining the water condensation content of the exhaust aftertreatment device further comprises measuring one or both of an ambient humidity and an ambient temperature and measuring one or both of an operational speed of a diesel engine coupled to the exhaust system and a fuel flow rate through the diesel engine.

11. The method of claim 8, wherein the exhaust aftertreatment device is a selective catalytic reduction system comprising a catalyst washcoat, the method further comprising:
   reacting the diesel exhaust fluid with a plurality of nitrogen oxide particles in the catalyst washcoat to create a plurality of water and nitrogen particles; and
   discharging the plurality of water and nitrogen particles through the exhaust conduit.

12. The method of claim 8, wherein determining the water condensation content of the exhaust aftertreatment device includes calculating the heat flux by measuring any combination of: an air and a fuel consumption, a temperature and a pressure of an intake and an exhaust of the diesel engine, and an exhaust gas recirculation rate.

13. The method of claim 8, further comprising the controller precluding a dosing event directed by the predetermined routine so that the injection device is not operated to provide diesel exhaust fluid to the exhaust aftertreatment device when the water condensation content of the exhaust aftertreatment device is determined by the controller to be above the specified threshold value.

14. A diesel exhaust system for treating an exhaust gas from a diesel engine, the diesel exhaust system comprising:
   an exhaust aftertreatment device;
   an injection device configured to introduce a diesel exhaust fluid into the exhaust aftertreatment device; and
   a controller electrically coupled to the injection device and programmed to receive outputs from a plurality of sensors, the controller being programmed to record a plurality of time durations including a dosing time defined as the amount of time the injection device is dosing the exhaust aftertreatment device per dosing event, and an engine cycle time defined as the time between when the engine is turned off until the engine is turned on again,
   wherein the controller is programmed to determine a water condensation content of the exhaust aftertreatment device, and to provide an output controlling the actuation of the injection device on the basis of the determined water condensation content of the exhaust aftertreatment device, the injection device being activated by the controller to dose the exhaust aftertreatment device with the diesel exhaust fluid in response to the controller determining that the water condensation content of the exhaust aftertreatment device is below a specified threshold value.

15. The diesel exhaust system of claim 14, wherein the plurality of sensors comprises a first temperature sensor configured to measure a temperature of the exhaust gas within the diesel exhaust system upstream of the exhaust aftertreatment device.

16. The diesel exhaust system of claim 15, wherein the plurality of sensors further comprises a second temperature sensor configured to measure a temperature of the exhaust aftertreatment device.

17. The diesel exhaust system of claim 16, wherein the plurality of sensors further comprises at least one sensor configured to measure one or both of an ambient humidity and an ambient temperature.

18. The diesel exhaust system of claim 17, wherein the plurality of sensors further comprises at least one sensor configured to measure one or both of an operational speed of a diesel engine coupled to the diesel exhaust system and a fuel flow rate through the diesel engine.

\* \* \* \* \*